(12) United States Patent
Remington et al.

(10) Patent No.: US 8,712,070 B2
(45) Date of Patent: Apr. 29, 2014

(54) SIMULTANEOUS ENHANCEMENT OF TRANSMISSION LOSS AND ABSORPTION COEFFICIENT USING ACTIVATED CAVITIES

(75) Inventors: Paul James Remington, Sudbury, MA (US); Alan Robert Douglas Curtis, Acton, MA (US); Istvan L. Ver, Stow, MA (US)

(73) Assignee: Raytheon Company, Waltham, MA (US)

(*) Notice: Subject to any disclaimer, the term of this patent is extended or adjusted under 35 U.S.C. 154(b) by 322 days.

(21) Appl. No.: 13/103,423

(22) Filed: May 9, 2011

(65) Prior Publication Data

US 2011/0211708 A1    Sep. 1, 2011

Related U.S. Application Data

(62) Division of application No. 11/756,182, filed on May 31, 2007, now Pat. No. 7,970,148.

(51) Int. Cl.
*A61F 11/06*    (2006.01)
*G10K 11/16*    (2006.01)
*H03B 29/00*    (2006.01)

(52) U.S. Cl.
USPC ........ 381/71.4; 381/71.1; 381/71.2; 381/71.8; 381/71.11; 381/71.12; 381/73.1; 381/94.1; 381/56; 381/57; 381/58; 181/206; 181/293; 181/148

(58) Field of Classification Search
USPC .................. 381/71.1, 71.2, 71.4, 71.8, 71.11, 381/71.12, 73.1, 94.1, 56–59; 181/206, 181/293, 148
See application file for complete search history.

(56) References Cited

U.S. PATENT DOCUMENTS

| | | | |
|---|---|---|---|
| 5,170,433 A | 12/1992 | Elliott et al. | |
| 5,979,593 A | 11/1999 | Rice et al. | |
| 6,829,131 B1 | 12/2004 | Loeb et al. | |
| 2002/0122561 A1 | 9/2002 | Pelrine et al. | |
| 2002/0126852 A1* | 9/2002 | Kashani ...................... 381/71.4 |
| 2003/0048911 A1 | 3/2003 | Furst et al. | |

\* cited by examiner

*Primary Examiner* — Vivian Chin
*Assistant Examiner* — Paul Kim
(74) *Attorney, Agent, or Firm* — Daly, Crowley, Mofford & Durkee, LLP

(57) ABSTRACT

A method and apparatus for providing simultaneous enhancement of transmission loss and absorption coefficient using activated cavities is presented. A layer of material is provided, and a backing plate having a plurality of cavities on the top surface of said backing plate, is disposed adjacent a top surface of said layer of material. A screen is disposed along the top surface of said cavities on said backing plate and at least one cavity includes an actuator disposed within the cavity and a control system receiving a signal from the microphone and receiving a signal from the accelerometer and providing a drive signal to the actuator to provide an acoustic output to provide simultaneous insertion loss and absorption which serves to minimize a linear combination of the signal from the microphone and the signal from the accelerometer.

5 Claims, 6 Drawing Sheets

SIMULTANEOUS ENHANCEMENT OF TRANSMISSION LOSS AND ABSORPTION COEFFICIENT USING ACTIVATED CAVITIES

CROSS REFERENCE TO RELATED APPLICATIONS

This application is a divisional application of U.S. patent application Ser. No. 11/756,182 entitled "SIMULTANEOUS ENHANCEMENT OF TRANSMISSION LOSS AND ABSORPTION COEFFICIENT USING ACTIVATED CAVITIES," filed on May 31, 2007 which is hereby incorporated herein by reference in its entirety.

BACKGROUND

The control of interior noise is a formidable problem. The sources of noise are many and varied; for example, in modern turbo-fan commercial aircraft, the turbulent boundary layer (TBL), engine noise and auxiliary equipment noise can all contribute to the interior noise. The primary source of interior noise is the turbulent boundary layer that forms around the exterior surface of the aircraft in flight, with the additional contribution of noise from the engines towards the rear of the aircraft. The random pressures generated in the TBL cause motion of the aircraft sidewalls, which then radiate sound into the interior. This sound then propagates through the walls and ceiling and into the interior of the aircraft. Reflected sound from the interior surfaces builds up a semi-reverberant noise field.

Current conventional noise control treatments are effective at moderate to high frequencies and so the residual noise spectrum is dominated by lower frequency noise centered around 300 Hz. At these frequencies, the use of conventional treatments is hampered by severe weight and volume constraints. Active noise control offers the potential of effective performance without a significant weight penalty.

Several studies, using a variety of approaches, have considered the application of active noise control for aircraft interior noise. A few systems have been fully developed, are available commercially and are in regular service, specifically for the control of tonal noise in the interior of propeller aircraft. Systems proposed for broadband interior noise include control of fuselage vibration, activated absorptive treatments, activated panels and enhanced double wall panel systems. Each of these systems has advantageous features and implementation drawbacks.

SUMMARY

Conventional mechanisms such as those explained above suffer from a variety of deficiencies. One such deficiency is that there is no single solution that provides both broadband transmission loss through the cabin wall of an aircraft and improved absorption in the cabin interior. Sound absorption by materials is typically limited by their size; thicker materials are required to absorb lower frequencies. A classic sound absorber is a cavity faced by an absorbent screen. When the depth of the cavity is one quarter of the wavelength of incident sound, a pressure null occurs inside the screen, reducing the local sound field and forcing the incident sound wave to expend energy by an increased acoustic particle velocity through the resistance of the screen. The use of these devices in aircraft is limited by the wavelength of typical noise sources; to be effective at 1000 Hz, a quarter-wave cavity must be approximately 4 inches deep.

Embodiments of the invention significantly overcome such deficiencies and provide mechanisms and techniques that provide noise control. The presently disclosed noise control system uses active components to enhance the performance of well-established passive noise control treatments and provides both broadband transmission loss through the cabin wall and improved absorption in the cabin interior.

Active-passive cavity absorbers use a shallow passive cavity absorber whose frequency range is extended by the inclusion of the combination of a small actuator (e.g., a loudspeaker) and a microphone, coupled by a local feedback loop which serve to reduce the sound pressure in the cavity at low frequencies. The effect of the active component is to extend the range of frequencies at which absorption occurs to much lower frequencies. The combination of the passive sound absorber enhanced by an active system, greatly reduces control interaction when multiple devices are used together, increasing the robustness of the combined system. Again, the use of multiple single input, single output (SISO) local control systems significantly reduces system complexity and installation and maintenance costs. All control, signal conditioning and power electronics are integral with the actuator unit; only a connection for electrical power is required.

Noise control is achieved by providing a layer of contiguous cavities with the backside closed and the front side covered with a flow resistive screen that forms a high transmission loss barrier. Within each cavity is an actuator, such as a loudspeaker or the like. At the front of each cavity is a microphone that measures the sound pressure near the flow resistive screen and an accelerometer that measures the acceleration of the cavity in the direction normal to the flow resistive screen. A control system drives received inputs from the microphone and accelerometer and provides an output that drives the actuator, so that an acoustic output of the actuator provides simultaneous insertion loss and absorption.

In a particular embodiment of a method for providing noise control, the method begins with receiving a signal from a microphone disposed within a cavity. The method also includes receiving a signal from an accelerometer disposed within the cavity. Additionally the method includes providing a drive signal to an actuator to produce an acoustic output of the actuator that provides simultaneous insertion loss and absorption, which serves to minimize a linear combination of the signal from the microphone and the signal from the accelerometer. It is to be understood that the embodiments of the invention can be embodied as software and hardware, or as hardware and/or circuitry alone.

In a particular embodiment within each cavity is an actuator. While the actuator could be realized as a speaker, in another embodiment the actuator comprises a first shell, a second shell and a driver (e.g., a piezoelectric patch) disposed on the first shell. The first shell and the second shell enclose a volume of air at a reduced pressure. Each cavity further includes two sensors, a microphone and an accelerometer, and a control system. The control system receives a signal from the microphone and receives a signal from the accelerometer and provides a drive signal to the actuator to produce an acoustic output from the actuator to minimize a linear combination of the signal from said microphone and the signal from said accelerometer. The sensors and the actuator are components of an active system that enhance both the insertion loss and the absorption, decreasing the noise that is both transmitted through the cabin wall and incident on the wall from other sources (or due to reverberant build up) in the cabin.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
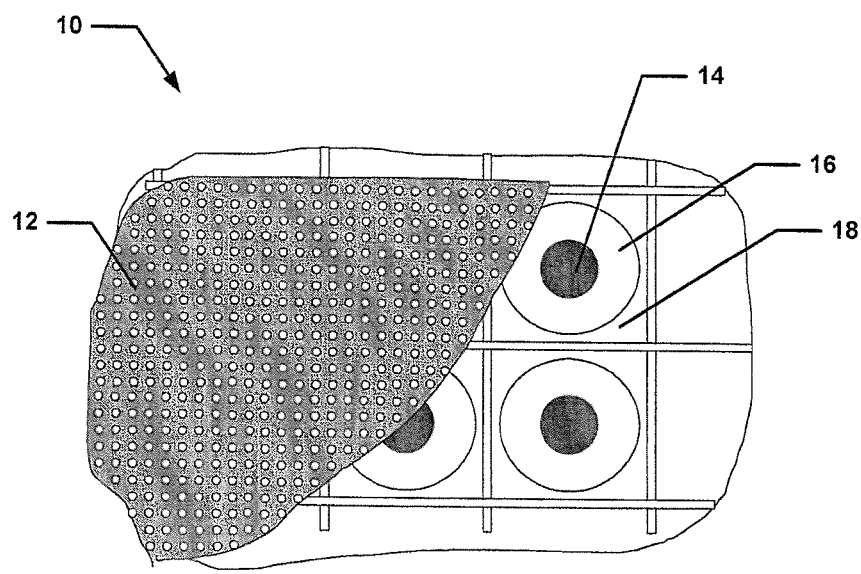
FIG. 1 depicts a top view of a particular embodiment of a noise control system in accordance with embodiments of the invention.
Figure 2:
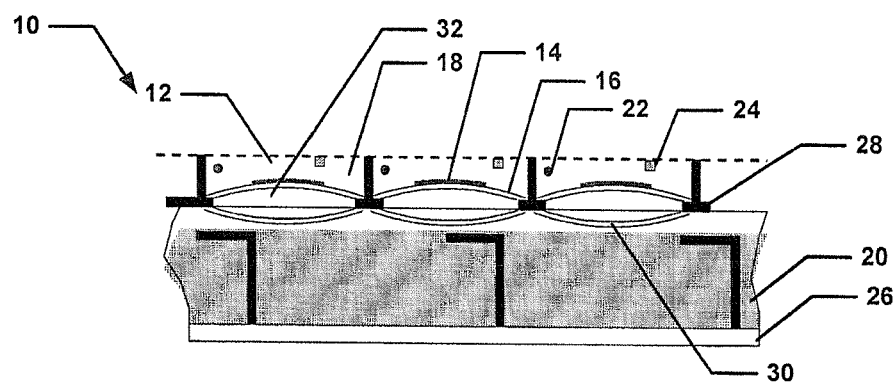
FIG. 2 depicts a cross-sectional view of a particular embodiment of a noise control system in accordance with embodiments of the invention.

Embodiments of the noise control system of the present invention incorporate both passive and active components that work in synergy to provide broadband transmission loss through the cabin wall of an aircraft and improved absorption in the cabin interior. An example embodiment 10 is illustrated in FIGS. 1 and 2. A layer of material 20 (e.g., a low density, micro-fiber glass fiber mat) is attached, or in close proximity, to the fuselage wall 26 on the interior of the aircraft or to the inner wall of the cabin of a vehicle. A layer of small cavities 18 is disposed above the glass fiber mat 20, such that a small air gap is present between the cavities 18 and the glass fiber mat 20. The cavities are defined by a backing plate 28 into which in one embodiment are inserted actuators composed of elements 14, 16, 32 and 30. A screen 12 is disposed along the top surface of the cavities 18. The first role of the cavities 18 is to provide mass loading that will enhance the passive insertion loss of the glass fiber mat 20. In addition, each cavity 18, with its flow resistive front face, acts as an acoustic absorber for noise incident from the cabin interior.

Within each cavity 18 is an actuator. While the actuator could be realized as a speaker, in another embodiment the actuator comprises a first shell 16, a second shell 30 and a driver 14 (e.g., a piezoelectric patch) disposed on the first shell 16. The first shell 16 and the second shell 30 enclose a volume of air at a reduced pressure 32. Each cavity 18 further includes two sensors, a microphone 22 and an accelerometer 24, and a control system. The control system receives a signal from the microphone and receives a signal from the accelerometer and provides a drive signal to the actuator to produce an acoustic output from the actuator to minimize a linear combination of the signal from said microphone and the signal from said accelerometer. The sensors 22 and 24 and the actuator are components of an active system that enhance both the insertion loss and the absorption, decreasing the noise that is both transmitted through the cabin wall and incident on the wall from other sources (or due to reverberant build up) in the cabin. While the cavities may be of any size, in a particular embodiment the cavities measure a few inches across and approximately one inch deep.

The active system controls a weighted sum of the inputs from each sensor where the weighting is selected to ensure that both noise control goals are met simultaneously. The actuator is both lightweight and capable of generating sufficient acoustic output at low frequencies.

In the noise control system one passive mechanism for transmission loss is the mass glass fiber mat 20. Sound impinging on the outside surface of the fuselage, or cabin wall, causes vibration of the wall 26. This, in turn, excites the layer of glass fiber mat 20. At low frequency the mass provided by the layer of thin activated cavities interacts with the stiffness of the glass fiber to provide an impedance discontinuity, which attenuates the transmission of sound into the aircraft interior. At higher frequency the mass of the layer of thin cavities on its own provides the impedance discontinuity that enhances the transmission loss of the fuselage or cabin wall. Careful choice of the properties of the glass fiber can enhance attenuation at lower frequencies over what could be achieved with the mass of the layer of cavities alone.

Another passive mechanism for sound absorption is the cavity absorber. At certain frequencies, typically at the quarter wave resonances of the cavity depth, incident sound has a high acoustic particle velocity at the entrance to the cavity. The flow resistive screen 12 at the entrance to the cavity resists this particle velocity and absorbs the energy of the incident sound. This principle is used in resonant Helmholtz absorbers in industrial noise control applications and in the acoustic liners of turbofan engines. As with the passive insertion loss noise control, this mechanism is most effective at higher frequencies. However, with activation, as described to below, the effectiveness can be extended to low frequencies The goal of the active control system is two fold. The active control system increases the insertion loss by generating sound that interferes with the sound radiated by the cavities due to their motion normal to the flow resistive layer. The active control system also extends the frequency range of the absorber by actively creating a low acoustic pressure in the cavity, mimicking the conditions created by a quarter wave resonance but across a wide band of frequencies. In order to achieve both these goals simultaneously two sensors are used, a microphone 22 to detect the sound pressure in the cavity and an accelerometer 24 to detect the vibration of the radiating face of the cavity.

The actuator is capable of producing sufficient low frequency sound yet is both small and lightweight. While in one embodiment the actuator is realized as a loudspeaker, in another embodiment, the actuator design is based on the concept of a vacuum bubble. Vacuum bubbles were originally developed as a noise control solution to the problem of implementing a layer of low impedance in air. High transmission loss can be obtained by implementing an impedance discontinuity. In air, a high impedance barrier requires mass. A low impedance barrier though lightweight is more of a challenge, particularly in air, as very few materials have a lower characteristic acoustic impedance than air.

A vacuum bubble is a metal shell with a very thin skin enclosing a volume in which the internal air pressure has been reduced. The shell is designed so that an in-plane compressive stress develops as the internal pressure is reduced. The in-plane stress reduces the effective bending stiffness of the shell. The reduced shell stiffness, together with the reduced stiffness of the internal air volume, results in a very compliant volume.

The actuator actively drives a vacuum bubble shell using one or more piezoelectric patch drivers. The internal volume is formed by two very shallow sections of spherical shell attached to a light backing plate through which a hole (not shown) has been stamped. The thin shells on each side of the hole in that backing plate form an airtight volume. In one embodiment, two shells are each equipped with a piezoelectric ceramic patch rather than one to avoid inducing bending stresses and inertial reaction forces on the backing plate. When the pressure in the internal volume is reduced, compressive stresses are induced in the shells and reaction tensile stresses in the backing plate. A piezoelectric ceramic patch is bonded to the surface of each shell, such that when activated the shell deforms increasing and decreasing the volume. By reducing the pressure in the internal volume, the compliance of the volume and shell can be significantly increased, lowering the actuator natural frequency and improving actuator output.

Figure 3:
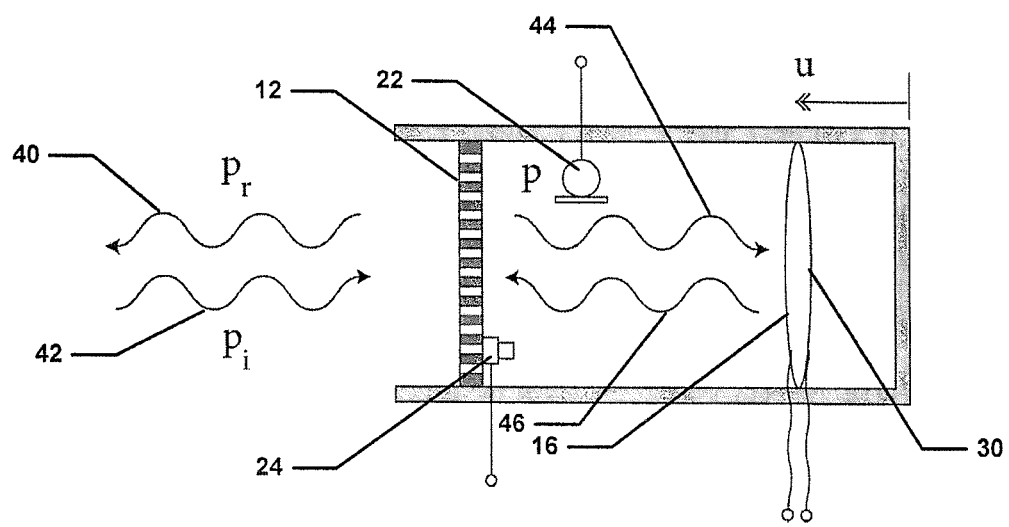
FIG. 3 depicts a schematic diagram of a particular embodiment of a noise control system in accordance with embodiments of the invention showing different sound waves.

The strategy and mechanism of this control approach can be illustrated by considering a simplified one-dimensional system, shown in FIG. 3. In this Figure a sound wave 40 is radiating from the front face of the cavity into the cabin. Part of this radiating wave is due to reflection of an incident wave 42 from noise sources in the cabin, part is due to motion of the face of the cavity due to vibration of the cabin wall (through the glass fiber mat which is here neglected). There is also a pair of sound waves in the cavity, 44 and 46 which are shown for completeness but are not cogent to the discussion to follow. The passage of sound through the flow resistive screen causes a pressure drop proportional to the local acoustic particle velocity. The actuator is driven so that the resulting sound pressure at the microphone 22 is p. The sound radiating from the face of the cavity into the cabin, $p_r$, is a combination of reflected incident sound $p_i$ and radiation due to the forced motion caused by wall vibration u. If the flow resistance of the screen is $z_1$ and the characteristic impedance of the air is $z_0$ then it can be shown that for one dimensional propagation the radiated sound pressure $p_r$, is given by $$p_r = \frac{1-a}{1+a}p_i + \frac{a}{1+a}(p + z_1 u)$$

where $p_r$ is the radiated sound pressure, a is the impedance ratio $$\frac{z_0}{z_1},$$

$p_i$ is the incident sound, $z_1$ is the flow resistance of the screen and u is the wall vibration.

The component of radiated sound due to reflection can be eliminated by selecting a=1, that is by selecting the flow resistance of the screen to be that of the characteristic impedance of the air. The component of the radiated sound due to motion of the cavity can be eliminated by driving the summed signal $e=p+z_1 u$ to be minimal. It is interesting to note that the control system removes the impedance of the cavity behind the screen effectively extending its quarter wave resonance to low frequency. This is accomplished not by driving the pressure in the cavity to zero, but by regulating the pressure to be approximately $-z_1 u$.

A practical installation of the noise control system has many small cavities each with its local sensors and actuators. The objective of the active control system is to drive each actuator with the signal required to achieve the acoustic condition of simultaneous insertion loss and absorption. In general, the active control system comprises a multiple input multiple output (MIMO) control system design problem in that the output of each actuator can, to some degree, cause an output at each sensor in the array of cavities. The hybrid nature of the present noise control system that has passive noise control elements as its foundation, will tend to minimize any cavity to cavity interaction potentially leading to the goal of noise control that can be achieved by using individual local control systems in each cavity. Although each control system may be local in that its output actuator drive signal depends only on the inputs from the local microphone and accelerometer, the design of the local control function may make use of information of cavity to cavity interaction to ensure performance and stable operation.

Figure 4:
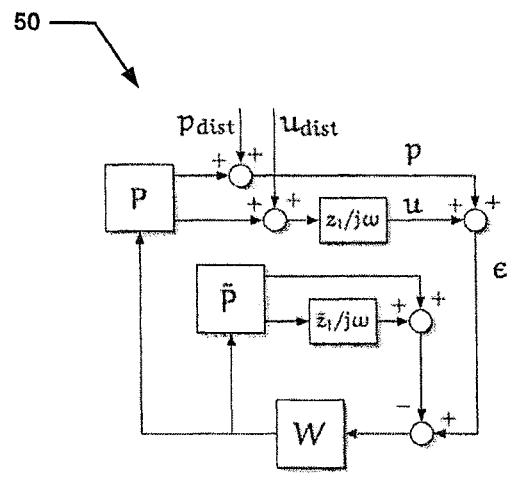
FIG. 4 depicts a block diagram of a first controller.
Figure 5:
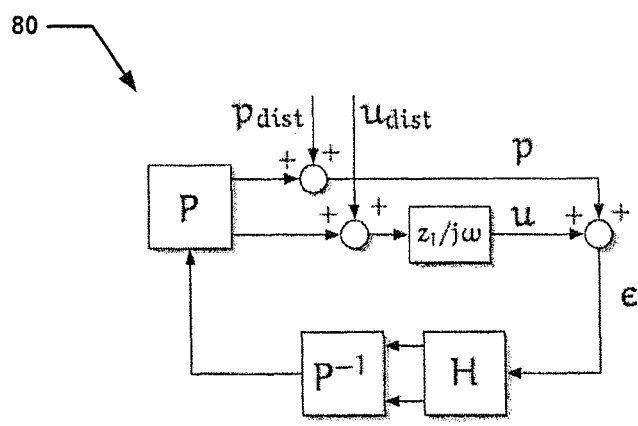
FIG. 5 depicts a block diagram of a second controller.

There are at least two options for the robust design of the controller transfer function, including the Internal Model Control Method, illustrated in FIG. 4 and the Compensator-Regulator method, illustrated in FIG. 5. In the Inner Model Method controller 50 of FIG. 4, the control filter in the main feedback loop has a secondary feedback loop around it as well. In that loop is a digital filter representation of the plant transfer function (the dynamic system being controlled). The presence of the plant transfer function in the feedback loop around the control filter transforms the feedback controller into a feed forward controller allowing all of the tools available for feed forward control filter design and adaptation to be applied to the feedback problem, including the filtered-X algorithm. To the extent that the digital filter representation of the plant transfer function is accurate, the Inner Model architecture ensures that the feedback system will be stable.

In the Compensator Regulator Method controller of FIG. 5, the control filter is divided into two parts: a compensation filter and a regulation filter. The purpose of the compensation filter is to remove the dynamics of the plant from the feedback loop. As such, the compensation filter is configured to approximate the inverse of the plant transfer function such that the product of the compensation filter and plant transfer function is approximately unity. The regulation filter then provides the high gain in the feedback loop over the range of frequencies where good performance is desired.

One of the most important considerations in the design process will be the true nature of the various physical transfer functions and their variability both over time and between units. The passive noise control components should be of benefit here as it is not expected to see the many lightly damped modes that are the bane of the designers of many active noise control system; the passive components will provide damping to the plant transfer functions and will smooth the variability between units. If a fixed SISO control structure is insufficient, we have the option of extending the control strategy to include adaptive control, multiple input single output (MISO) control and banded multiple input multiple output (MIMO) control.

Figure 6:
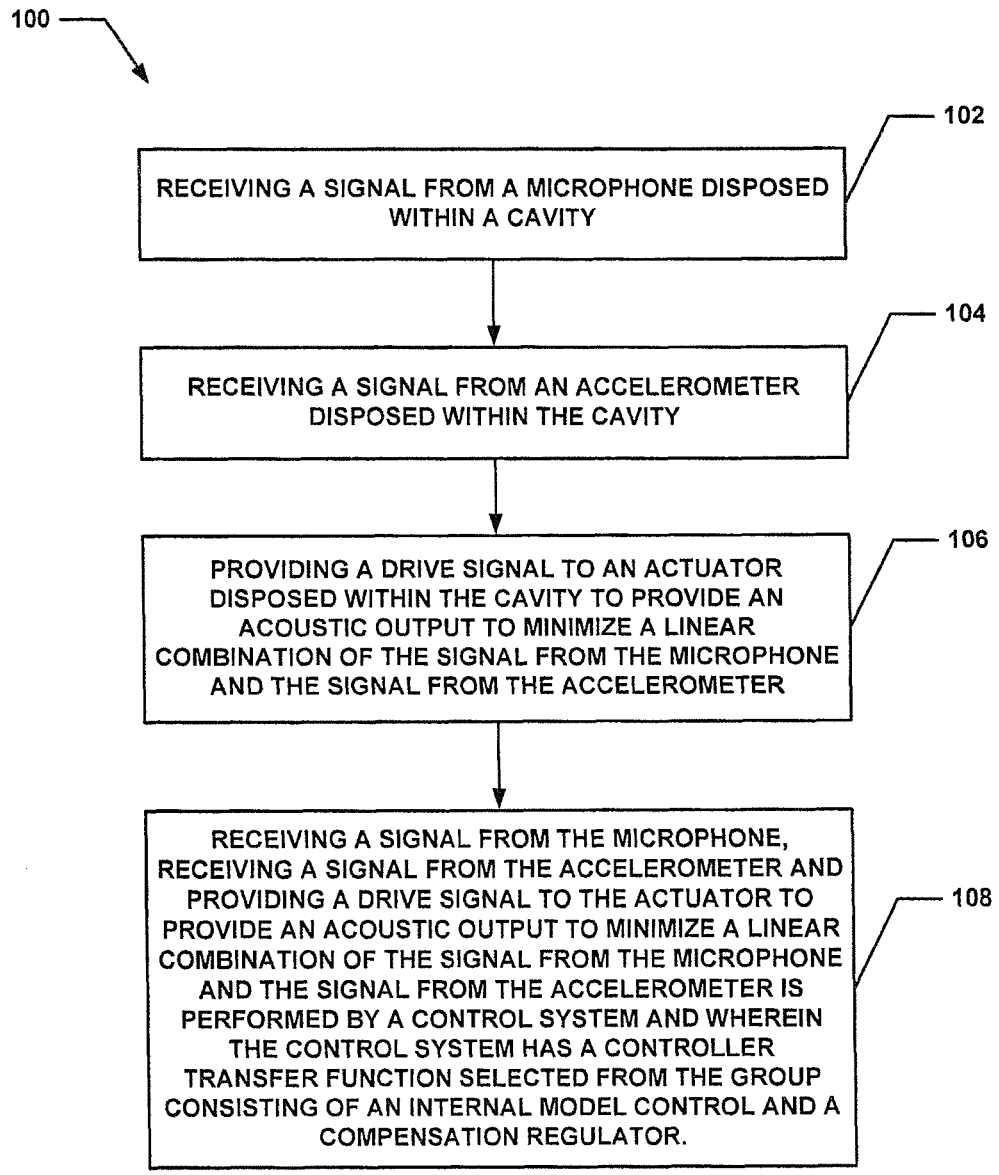
FIG. 6 comprises a flow diagram of a particular embodiment of a method for providing noise control in accordance with embodiments of the invention.
Figure 7:
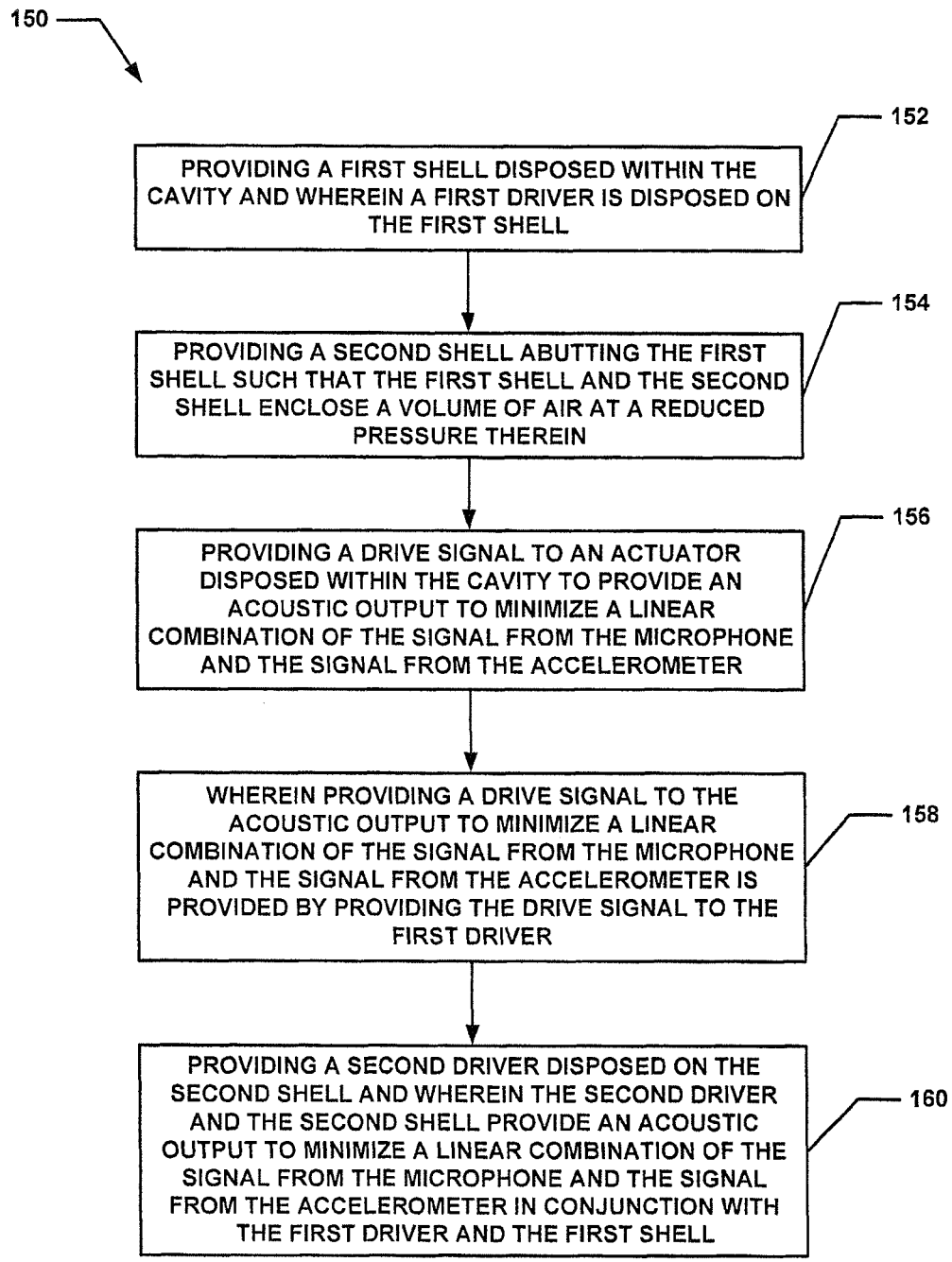
FIG. 7 comprises a flow diagram of a particular embodiment of a method of providing an actuator in accordance with embodiments of the invention.
Figure 8:
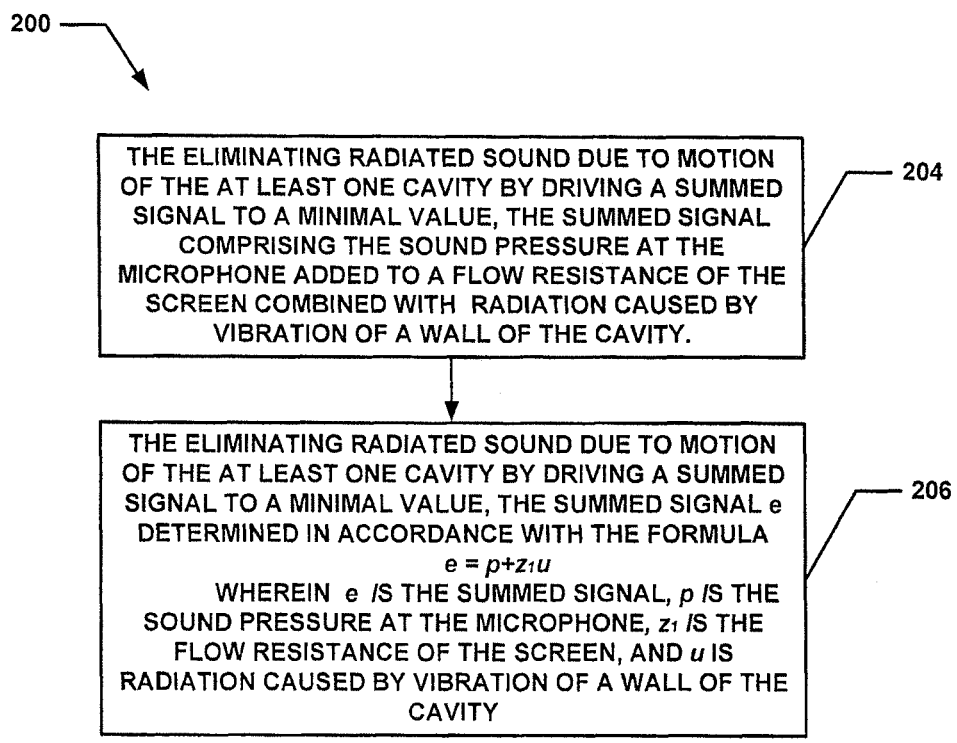
FIG. 8 comprises a flow diagram of a particular embodiment of a method for reduction of radiated sound in accordance with embodiments of the invention.

Flow charts of particular embodiments of the presently disclosed methods are depicted in FIGS. 6-8. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 6, a particular embodiment of a method 100 of providing noise control is shown. The method 100 begins with processing block 102 which recites receiving a signal from a microphone disposed within a cavity. The microphone measures pressure within the cavity and provides an output signal which is used as part of a feedback loop in order to provide an output signal for driving an actuator.

Processing block 104 discloses receiving a signal from an accelerometer disposed within the cavity. The accelerometer measures the velocity of the cavity and provides an output signal which is used as part of a feedback loop in order to provide an output signal for driving the actuator.

Processing block 106 states providing a drive signal to an actuator to provide an acoustic output to provide simultaneous insertion loss and absorption. The provided signal serves to minimize a linear combination of the signal from the microphone and from the signal from the accelerometer. The actuator, in certain embodiments, may be realized as a speaker.

Processing continues with processing block 108 which recites wherein receiving a signal from the microphone, receiving a signal from the accelerometer, and providing a drive signal to the actuator to provide an acoustic output to provide simultaneous insertion loss and absorption, which serves to minimize a linear combination of the signal from the microphone and the signal from the accelerometer, is performed by a control system and wherein the control system has a controller architecture selected from the group consisting of an internal model control and a compensator-regulator.

In the Inner Model Method controller, the control filter in the main feedback loop has a secondary feedback loop around it as well. In that loop is a digital filter representation of the plant transfer function. The presence of the plant transfer function in the feedback loop around the control filter transforms the feedback controller into a feed forward controller allowing all of the tools available for feed forward control filter design and adaptation to be applied to the feedback problem, including the filtered-X algorithm. To the extent that the digital filter representation of the plant transfer function is accurate, the Inner Model architecture ensures that the feedback system will be stable.

In the Compensator-Regulator Method controller, the control filter is divided into two parts: a compensation filter and a regulation filter. The purpose of the compensation filter is to remove the dynamics of the plant from the feedback loop. As such, the compensation filter is configured to approximate the inverse of the plant transfer function such that the product of the compensation filter and plant transfer function is approximately unity. The regulation filter then provides the high gain in the feedback loop over the range of frequencies where good performance is desired. All these serve to provide both broadband transmission loss and improved absorption.

Referring now to FIG. 7, a method 150 of providing an actuator in accordance with embodiments of the invention is shown. The method begins with processing block 152 which discloses providing a first shell disposed within the cavity and wherein a first driver is disposed on the first shell. Preferably, the first shell comprises a metal shell with a very thin skin which (in combination with a second shell) encloses a volume in which the internal air pressure has been reduced. The shell is designed so that an in-plane compressive stress develops as the internal pressure is reduced. The in-plane stress reduces the effective bending stiffness of the shell. The reduced shell stiffness, together with the reduced stiffness of the internal air volume, results in a very compliant volume. The driver may be realized as a piezoelectric ceramic patch which is bonded to the surface of the shell, such that when activated the shell deforms increasing and decreasing the volume. By reducing the pressure in the internal volume, the compliance of the volume and shell can be significantly increased, lowering the actuator natural frequency and improving actuator output.

Processing continues with processing block 154 which states providing a second shell abutting the first shell such that the first shell and the second shell enclose a volume of air at a reduced pressure therein. The second shell also comprises a metal shell with a very thin skin which (in combination with the first shell) encloses a volume in which the internal air pressure has been reduced.

Processing block 156 recites providing a drive signal to an actuator disposed within a cavity to produce an acoustic output which provides simultaneous insertion loss and absorption to minimize a linear combination of the signal from the microphone and the signal from the accelerometer. As shown in processing block 158 providing a drive signal to an actuator disposed within a cavity to produce an acoustic output which provides simultaneous insertion loss and absorption to minimize a linear combination of the signal from the microphone and the signal from the accelerometer is provided by providing the drive signal to the first driver.

Processing block 160 discloses providing a second driver disposed on the second shell and wherein the second driver and the second shell produce a drive signal to the actuator disposed within a cavity to produce an acoustic output which provides simultaneous insertion loss and absorption to minimize a linear combination of the signal from the microphone and the signal from the accelerometer in conjunction with the first driver and the first shell.

Referring now to FIG. 8, a particular embodiment of a method 200 for eliminating radiated sound is shown. The method 200 begins with processing block 204 which recites eliminating radiated sound due to motion of the at least one cavity by driving a summed signal to a minimal value, the summed signal comprising the sound pressure at the microphone added to a low resistance of the screen combined with radiation caused by vibration of a wall of the cavity. One manner to achieve this is shown in processing block 206 which discloses eliminating radiated sound due to motion of the at least one cavity by driving a summed signal to a minimal value, the summed signal e determined in accordance with the formula $e=p+z_1 u$ wherein e is the summed signal, p is the sound pressure at the microphone, $z_1$ is the flow resistance of the screen, and u is the velocity of the face of the cavity.

A noise control system and method utilizes active components to enhance the performance of well-established passive noise control treatments and provides both broadband transmission loss through the cabin wall and improved absorption in the cabin interior. Noise control is achieved by providing a layer of contiguous cavities with the backside closed and the front side covered with a flow resistive layer that forms a high transmission loss barrier. Within each cavity is an actuator, such as a loudspeaker or the like. At the front of each cavity is a microphone that measures the sound pressure near the flow resistive screen and an accelerometer that measures the acceleration of the cavity. A control system receives inputs from the microphone and accelerometer and provides an output that drives the actuator, so that an acoustic output of the actuator provides simultaneous insertion loss and absorption.

In a particular embodiment the actuator comprises a first shell, a second shell and a driver 14 (e.g., a piezoelectric patch) disposed on the first shell. The first shell and the second shell enclose a volume of air at a reduced pressure. The control system receives a signal from the microphone and receives a signal from the accelerometer and provides a drive signal to the actuator to produce an acoustic output from the actuator to minimize a linear combination of the signal from said microphone and the signal from said accelerometer.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing noise control comprising:
    receiving a signal from a microphone disposed within a cavity;
    receiving a signal from an accelerometer disposed within said cavity;
    providing a drive signal to an actuator to provide an acoustic output to provide simultaneous insertion loss and absorption which serves to minimize a linear combination of said signal from said microphone and said signal from said accelerometer;
    providing a first shell disposed within said cavity and wherein a first driver is disposed on said first shell;
    providing a second shell abutting said first shell such that said first shell and said second shell enclose a volume of air at a reduced pressure therein; and
    wherein said providing a drive signal to the actuator to provide an acoustic output to provide simultaneous insertion loss and absorption which serves to minimize a linear combination of the signal from said microphone and the signal from said accelerometer is provided by providing said drive signal to said first driver.

2. The method of claim 1 further comprising providing a second driver disposed on said second shell and wherein said second driver and said second shell provide an acoustic output to provide simultaneous insertion loss and absorption which serves to minimize a linear combination of the signal from the microphone and the signal from the accelerometer in conjunction with said first driver and said first shell.

3. The method of claim 1 further comprising eliminating radiated sound due to motion of the cavity having a screen by driving a summed signal to a minimal value, said summed signal comprising the sound pressure at the microphone added to a flow resistance of said screen combined with the velocity of vibration of said cavity in the direction normal to the flow resistive screen.

4. The method of claim 1 wherein said receiving signal from said microphone, said receiving a signal from said accelerometer and said providing a drive signal to said actuator to provide an acoustic output to provide simultaneous insertion loss and absorption which serves to minimize a linear combination of the signal from the microphone and the signal from the accelerometer is performed by a control system and wherein said control system has a controller architecture selected from the group consisting of an internal model control and a compensator regulator.

5. A method of providing noise control comprising:
    receiving a signal from a microphone disposed within a cavity;
    receiving a signal from an accelerometer disposed within said cavity;
    providing a drive signal to an actuator to provide an acoustic output to provide simultaneous insertion loss and absorption which serves to minimize a linear combination of said signal from said microphone and said signal from said accelerometer; and eliminating radiated sound due to motion of the cavity having a screen by driving a summed signal to a minimal value, the summed signal e determined in accordance with the formula $$e = p + z_1 u$$

wherein e is the summed signal, p is the sound pressure at the microphone, $z_1$ is the flow resistance of the screen, and u is the velocity of vibration of said cavity in the direction normal to the flow resistive screen.

* * * * *